Feb. 20, 1923.
E. A. SPERRY
GYROSCOPIC NAVIGATIONAL APPARATUS
Filed Sept. 18, 1919
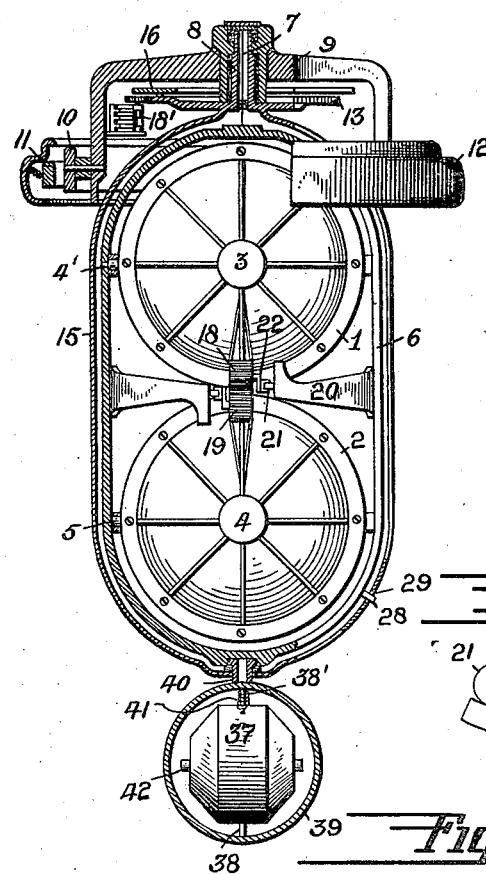
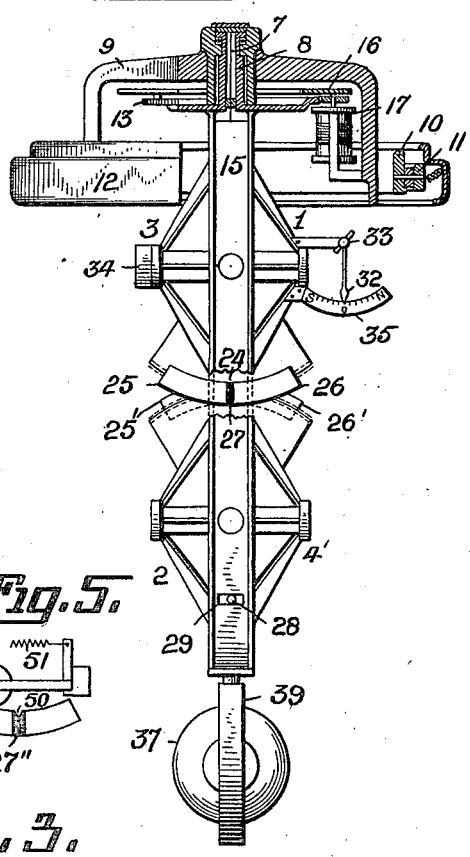
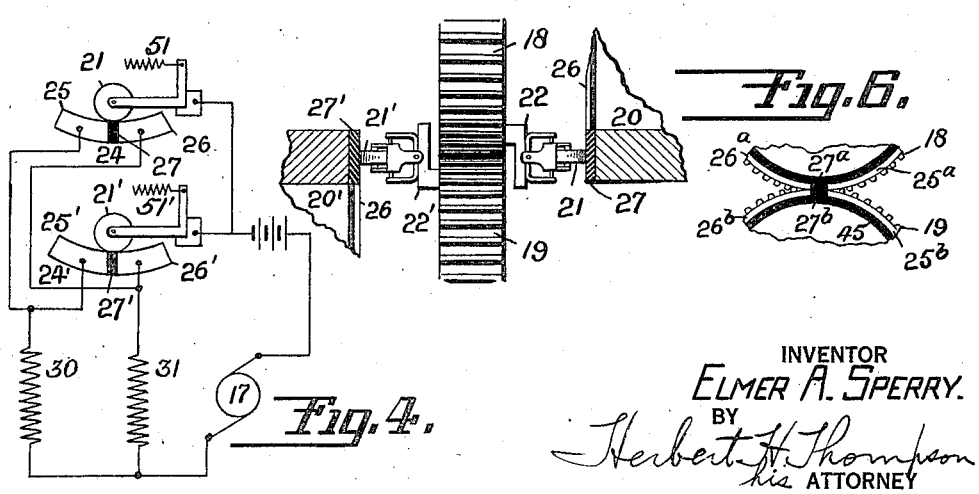
INVENTOR
ELMER A. SPERRY.
BY
Herbert H. Thompson
his ATTORNEY Patented Feb. 20, 1923.

1,445,805

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

GYROSCOPIC NAVIGATIONAL APPARATUS.

Continuation of application Serial No. 871,885, filed November 13, 1914. This application filed September 13, 1919. Serial No. 324,731.

*To all whom it may concern:*

Be it known that I, ELMER A. SPERRY, a citizen of the United States of America, residing at 1505 Albemarle Road, Brooklyn, New York, in the county of Kings and State of New York, have invented certain new and useful Improvements in Gyroscopic Navigational Apparatus, of which the following is a specification.

This invention relates to gyroscopic apparatus adapted for navigational purposes in which one or more gyroscopes are employed to furnish the mariner with his bearings. This application is a division of my copending application for Letters Patent Serial No. 871,885, filed November 13, 1914, for "Navigational apparatus," now matured into Letters Patent No. 1,360,694, November 30, 1920, and also contains matter divided from my copending application Serial No. 47,550, filed August 26, 1915, for "Gyroscopic apparatus for torpedoes".

The present invention is designed for use as a compass but differs somewhat from the ordinary gyroscopic compass in that the instrument, according to the present invention, possesses no positive directive power but is designed to maintain the direction in which it is set with respect to the earth. It differs, however, from known instruments of this character in that my gyroscopic apparatus will follow the rotation of the earth and, therefore, is designed to remain horizontal. There are many features of the invention, however, of broader application than to this particular embodiment, having application to gyroscopic compasses and, in fact, to all forms of gyroscopic apparatus used for maintaining a reference plane on moving bodies. In fact it is just as important, if not of greater importance, to eliminate disturbing influences in gyroscopic apparatus of this character than in gyroscopic compasses since in the latter the directive force of the compass will cause it to turn to the meridian even if temporarily displaced, while in this apparatus any displacement becomes permanent and, therefore, more objectionable.

The purpose of the present invention is, therefore, to eliminate sources of deviation from a predetermined plane in gyro-navigational apparatus when placed on moving bodies such as ships, whether the apparatus be of the meridian seeking type or of the fixed plane type. The principal causes of such deviation have been found to be friction about the vertical axis arising when the ship turns and oscillations in planes at acute angles to the plane of the rotor, or in the so-called inter-cardinal planes. Friction about the vertical axis necessarily gives rise to precession of the gyroscopes about their horizontal axes. By bringing into action means responsive to this precession and operating about the vertical axis I am enabled to largely overcome the effect of such friction. Without going into the theory of the causes of deviation due to oscillations in the aforementioned planes the fact is that such deviations exist and that by damping out or preventing such oscillations it necessarily follows that deviation is prevented from this cause.

Referring to the drawings in which what I now consider to be the preferred form of my invention is shown:

Fig. 1 is a front elevation, partly in section, of a gyroscopic apparatus manufactured according to my invention.

Fig. 2 is a side elevation, partly in section, of the same.

Fig. 3 is an enlarged detail of the contact portions of the gyroscopic apparatus.

Fig. 4 is a wiring diagram showing how the motor is actuated from the contacts.

Figs. 5 and 6 are, respectively, details showing modified forms of the trolley contact and the contact device for operating motor 17 on the instrument.

The main portion of the instrument comprises two gyroscopic rotors designed to be oppositely rotated at the same speed by polyphase alternating current, similar to the method shown in my Patent 1,186,856 "Gyroscopic apparatus", June 13, 1916. The rotors are not shown, but are enclosed in close-fitting, air-tight frames or casings 1 and 2, which conform in a general way to the shape of the rotor. The rotors are mounted on horizontal spinning axes 3 and 4 within the casings. These casings are pivoted on diametrically extending, horizontal pivots 4' and 5 on an element or frame 6, which is suspended by means of a member 7 of more or less flexibility. That is, it may be in the form of a torsion filament or wire designed to transmit a torque from the supporting spindle 8, but to do so gradually and without shock, or it may be a slender but comparatively stiff rod. As shown, the spindle or support 8 is rotatably supported by a spider 9, which in turn is supported by the usual gimbal rings 10 and 11, within main frame 12, the support for which is not shown. Secured to said spindle are the large gear 13 and the outer ring 15. Gear 13 supports the compass scale 16 and is designed to be rotated by a motor 17 and to rotate a transmitter 18′ for transmitting the readings of the instruments to distant points.

The two casings are preferably superimposed within the frame and symmetrically located with respect to the vertical axis so that no motion of translation is imparted to the gyroscopes when the frame 6 is turned or oscillated in azimuth, and are connected so that precession is permitted only in opposite directions, as by means of segmental gears 18 and 19. By this simple construction I am enabled to overcome the chief difficulty connected with this type of gyro apparatus, namely the error arising from the earth's rotation, since any tendency for the axis of one gyro to rise is opposed by the equal and opposite tendency of the other gyro. I also employ novel means to overcome the errors due to friction about the vertical axis of the support and due to the force required to drive the transmitter 18, thereby preventing the gyros from wandering. This comprises a contact device which is closed as soon as either gyro precesses beyond a predetermined point, and which operates the motor 17 referred to above. This device may be located upon one of the gears 18 or 19 and upon a bracket 20 fixed to frame 6. It is shown as comprising a trolley 21 pivotally mounted on a base 22 secured to gear 18 and a curved contact strip 24 on bracket 20. Said strip is composed of two conducting sections 25 and 26 separated by a dead section 27. The trolley normally rests on the dead section but a relative inclination in either direction with respect to the frame will cause a circuit to be completed through motor 17, as shown in Fig. 4. This will exert a torque about the vertical axis through the resilient torsion connection 7 causing the gyro to precess back to its central position. It should be noted that the contact is so located that it is closed only by relative inclination of the gyros and frame and cannot be closed by swinging of the whole frame 6. The contact device is preferably duplicated on the gyro 2, as shown, corresponding parts being numbered with the same numerals primed, whereby a more perfect balance and greater reliability are secured and the error due to backlash of the gear teeth overcome.

In order to prevent the element 15 from twisting too far away from the frame 6, due to the resiliency of support 7 under the influence of the motor 17, a limit stop may be employed such as pin 28 on one frame working in a slot 29 in the other. The compass card 16, which is mounted on element 15, will thus be kept in the correct position.

By employing this novel device I eliminate the effect of friction about the vertical axis, since when the ship turns practically the entire work necessary to hold the gyros fixed in space and to rotate the transmitter is performed by motor 17. Said motor may be a standard D. C. motor of any type. As shown, it is provided with two opposed field windings 30 and 31 connected to the contact strips 25, 26, 25′, and 26′, as shown in Fig. 4, so that the motor is reversed every time the trolleys cross from one contact to the other.

In all gyroscopic apparatus which is designed to maintain a level on the surface of the earth, it has been found desirable to provide the apparatus with an eccentric weight designed to cause precession about the vertical axis of the instrument at exactly the required rate to keep the instrument in a given position. This rate of precession varies from 360° in 24 hours in a clockwise direction at the north pole through zero at the equator to 360° in 24 hours in a counter-clockwise direction at the south pole. To take care of these varying conditions I have devised the adjustable weight 32 supported from the clamp-pivot 33, and balanced when in its vertical position by a counter weight 4. Hence this position is the correct one for the equator. In north latitude the bob 32 is swung out and adjusted so that it points to the corresponding graduation on the circular scale 35, while in south latitude it is swung in. My device possesses the further advantage that the scale need not be graduated with a special scale, but is simply laid out in degrees. This feature is due to the fact that the moment of the weight required is proportional to the cosine of the latitude, while my device secured this result by providing a circular means of adjustment which, while it is moved through an equal arc for each degree of change in latitude, the moment applied is proportional to the cosine of the angle it makes with its normal position.

I prefer also to equip this instrument with means to stabilize or damp out oscillations of the gyroscopes and their supporting means in the plane of the frames 6 and 15, the stabilizing effect of the main gyroscopes being sufficient to stabilize the parts in the other planes. For this purpose I employ an auxiliary gyroscope 36 comprising a rotor supported in a casing 37, which in turn is pivoted on vertical pivots 38 and 38′ within a ring 39, the whole being connected to the bottom of the frame 6 by extension 40 which is journalled in outer or follow-up support 15, thereby also forming a lower guide bearing for the frame 6 in support 15. Said gyroscope is also provided with a centralizing spring 41 extending between ring 39 and a point on the gyro casing 37 so that the stabilizing gyroscope will normally be maintained with its spinning axis 42 at right angles to the spinning axes 3 and 4 of the main gyroscope and will act to stabilize the frame about an axis perpendicular to the spinning axis 42, in other words, about an axis parallel to the axes of stabilization of the main gyroscope.

While I am aware that it is old to provide an auxiliary gyroscope on gyroscopic apparatus of this general nature, by mounting the stabilizing gyroscope for independent precession with respect to the parts to be stabilized I am enabled to employ a much smaller stabilizing gyroscope than would otherwise be necessary. By means of this gyroscope oscillation in inter-cardinal planes is largely prevented, and, therefore, deviation due to such oscillation eliminated.

The peculiar inter-relation between the directive and stabilizing gyroscope might be pointed out in this connection. The stabilizing gyroscope by preventing or reducing the oscillation of the main frame reduces deviations of the apparatus by eliminating the causes of error, while the directive gyroscope on the other hand increases the efficiency of the stabilizing gyroscope by preventing turning in azimuth of the main supporting frame 6 when the ship turns. If the stabilizing gyroscope were mounted in a cardon support independent of the directive gyroscope so that it turned with the ship it will at once be apparent that whenever the ship turns a torque would be applied about the vertical axis of the stabilizing gyroscope through the spring 38′ thereby causing the stabilizing gyroscope to cause an oscillation of the main frame. If the stabilizing gyroscope is, however, stabilized in azimuth, or in other words, prevented from turning about the vertical axis with the turning of the ship it will prevent oscillation of the pendulous frame almost entirely.

In Fig. 5 a modified form of trolley contact is shown, in which the insulated section 27″ is made with a depressed portion 50 so that when the trolley runs on said section, it will exert a centralizing effect on the gyroscopes due to the tension of the trolley spring 51.

Fig. 6 shows a modified form of contact device for operating the motor 17 on the instrument. According to this modification I mount contact strips 25$^a$, 26$^a$, 25$^b$, and 26$^b$ directly on a portion of each rotor casing, preferably on the gear sectors 18 and 19, the strips being separated as before by insulating pieces 27$^a$ and 27$^b$. These strips are placed on the pitch circle of the gear teeth, being arranged to roll upon each other as indicated, and are insulated from the gears by insulation 45. This arrangement does away with the use of any extra parts such as brackets 20 and 20′ on the frame 6. It also emphasizes an important advantage of my invention over prior structures, which lies in the fact that the contacts governing motor 17 cannot be closed by any motions of the frame 6, but only precession of the gyroscopes about their pivots 4 and 5.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In gyroscopic navigational apparatus, the combination with a support, of a gyroscopic unit which together with its contained parts is pendulously mounted thereon, said unit comprising a main gyroscope adapted to spin about a normally horizontal axis and mounted for turning in azimuth, an auxiliary gyroscope, and means for mounting the same on said pendulous unit for independent precession and for spinning about axes at angles to said horizontal axis.

2. In gyroscopic navigational apparatus, the combination with a support, of a gyroscopic unit which together with its contained parts is pendulously mounted thereon, said unit comprising a main gyroscope adapted to spin about a normally horizontal axis and mounted for turning in azimuth, an auxiliary gyroscope, and means for mounting the same on said pendulous unit for precession about a vertical axis within the said unit.

3. In gyroscopic navigational apparatus, the combination with a support, of a gyroscopic unit which together with its contained parts is pendulously mounted thereon, said unit comprising a main gyroscope adapted to spin about a normally horizontal axis and mounted for turning in azimuth, an auxiliary gyroscope, and means for mounting the same for precession about a vertical axis within said unit and for spinning about a second horizontal axis.

4. In gyroscopic navigational apparatus, the combination with a support, of a gyroscopic unit which together with its contained parts is pendulously mounted thereon, said unit comprising a main gyroscope adapted to spin about a normally horizontal axis and mounted for turning in azimuth, an auxiliary gyroscope, means for mounting the same on said unit for independent precession and for spinning about axes at angles to said horizontal axis, and resilient means between said gyroscope and unit for centralizing said auxiliary gyroscope about its precession axis.

5. A gyroscopic navigational instrument comprising a pair of rotors adapted to be oppositely rotated, frames for said rotors pivoted upon normally horizontal parallel axes and geared together for opposite precession, and an adjustable weight for exerting a torque about said horizontal axes.

6. A gyroscopic navigational instrument comprising a pair of rotors adapted to be oppositely rotated, frames for said rotors pivoted upon normally horizontal parallel axes and geared together for opposite precession, an adjustable weight for exerting a torque about said horizontal axes, and a centralizing means for said frames.

7. In gyroscopic apparatus, a frame pivotally supported on a vertical axis, a pair of oppositely rotated gyros pivotally supported on horizontal parallel axes by said frame, and connected for opposite precession, and means to prevent said gyros from wandering comprising a motor adapted to exert a torque about said vertical axis.

8. In gyroscopic apparatus, a frame pivotally mounted about the vertical axis, a pair of gyroscopes supported by said frame on parallel horizontal axes, and means responsive to relative precession of said gyros about said axes for exerting a torque about said vertical axis.

9. In gyroscopic apparatus, a frame pivotally mounted about the vertical axis, a pair of gyroscopes supported by said frame on parallel horizontal axes, means connecting said gyroscopes allowing only relative precession, and means responsive to relative precession of said gyros about said axes for exerting a torque about said vertical axis.

10. In a gyroscopic navigational instrument, the combination with a rotor frame pivotally mounted on a horizontal axis, of a pivotally mounted adjustable weight secured to one side of the frame, a circular scale adapted to be read in connection with said weight, said frame being so designed that by setting the weight on the degree on the scale, that is the same as the latitude, the direction and magnitude of the torque exerted by the weight will cause the instrument to be apparently unaffected by the earth's rotation.

11. In gyro-navigational apparatus, a pendulously supported frame, a gyroscope for stabilizing the same and its connected parts about an axis, a main gyroscope, means for mounting the same for oscillation about a second axis and for turning in azimuth, and means responsive to relative inclination of said main gyroscope and said frame for exerting a torque thereon.

12. In gyro-navigational apparatus, the combination with a gyro-rotor and rotor-bearing casing, a pendulous frame on which the said casing is mounted for oscillation about a horizontal axis, a rotatable support for said frame, and means responsive to inclination of the gyroscope with respect to said frame and support for turning the latter in azimuth.

13. In gyro-navigational apparatus, the combination with a gyro-rotor and rotor-bearing casing, a pendulous frame on which the said casing is mounted for oscillation about a horizontal axis, a rotatable support for said frame, an auxiliary stabilizing gyroscope connected to said frame and support, and means responsive to inclination of the gyroscope with respect to said frame and support for turning the latter in azimuth.

14. In gyro-navigational apparatus, the combination with a gyro-rotor and rotor-bearing casing, a pendulous frame on which the said casing is mounted for oscillation about a horizontal axis, a follow-up support for said frame, a yielding connection between said support and frame, and means responsive to inclination of the gyroscope with respect to said frame and support for turning the latter.

15. In gyro-navigational apparatus, the combination with a gyro-rotor and rotor-bearing casing, a pendulous frame on which the said casing is mounted for oscillation about a horizontal axis, a follow-up support for said frame, an auxiliary stabilizing gyroscope connected to said frame and support, a yielding connection between said support and frame, and means responsive to inclination of the gyroscope with respect to said frame and support for turning the latter in azimuth.

16. In gyro-navigational apparatus adapted to be carried on a rocking platform, the combination with a gyroscopic directive element including a frame adapted to turn about a vertical axis, a pendulous supporting means for said element and frame, means mounting said supporting means for oscillation about a horizontal axis, and gyroscopic stabilizing means mounted on said supporting means adapted to reduce deviation due to motions of said platform.

17. A gyro-navigational apparatus as claimed in claim 16 in which means are employed to reduce errors due to friction while said supporting means is moving around said vertical axis.

18. In gyro-navigational apparatus adapted to be carried on shipboard, the combination with a gyroscopic directive element provided with horizontal pivots, pendulous supporting means therefor, adapted to rotate around a vertical axis, means adapted to compensate for friction while said supporting means is so moving, and stabilizing means connected with said supporting means adapted to reduce deviation due to motions of said platform.

19. A gyroscopic-navigational apparatus as claimed in claim 18 in which the said stabilizing means comprises an auxiliary gyroscope mounted for independent precession and yieldingly connected to said supporting means.

20. In gyroscopic apparatus, a pair of gyroscopes pivotally mounted in a common frame and connected for opposite precession, electrical contact for said gyros comprising a pair of contacting strips separated by a block of insulation and a trolley adapted to close an electric circuit on precession of the gyro away from the central position, a motor in said circuit connected so as to exert a torque on said frame about an axis at right angles to the precession axis, said block and trolley being designed to exert a centralizing torque about the precession axis as the trolley rolls from a strip onto the block.

21. In gyroscopic apparatus, a frame pivotally mounted about the vertical axis, a pair of gyroscopes supported by said frame on horizontal parallel axes, resilient centralizing means for exerting a torque about said horizontal axes on relative precession, and independent means responsive to relative precession of said gyros about said horizontal axes for exerting a torque about said vertical axis.

22. In gyroscopic navigational apparatus, a frame mounted for turning about a vertical axis, an exterior or supporting frame universally mounted for oscillation about horizontal axes, a directive gyroscope pivoted within said first frame on a horizontal axis, and an auxiliary gyroscope connected to the frames for independent precession to stabilize the same about at least one of said horizontal axes of oscillation.

23. In gyro-navigational apparatus, a pair of superimposed gyroscopes, a common frame in which each is mounted on a substantially horizontal parallel axis, and means mounting said frame for turning about a vertical axis.

24. In gyro-navigational apparatus, a pair of superimposed gyroscopes, a common frame in which they are mounted on parallel axes, a support for said frame rotatable about a vertical axis and power means for rotating the same controlled by a gyroscope.

25. In gyro-navigational apparatus, a pair of oppositely acting superimposed gyroscopes, a common frame in which they are mounted for oscillation about horizontal parallel axes, means connecting said gyroscopes, and means mounting said frame for turning about a vertical axis.

26. In gyroscopic apparatus, a frame pivotally supported on a vertical axis, a pair of oppositely rotated gyroscopes pivotally supported on horizontal parallel axes within said frame and connected about said horizontal axes, and means responsive to turning of at least one of said gyroscopes with repect to the frame for exerting a torque thereon about its vertical axis.

27. In gyroscopic navigational apparatus, a support rotatably mounted about a vertical axis, power means for rotating the same, a pair of superimposed oppositely rotated gyroscopes mounted within said support on substantially parallel axes, and means controlled by at least one of said gyroscopes for actuating said power means.

28. In a gyro navigational apparatus, a pair of superimposed oppositely acting gyroscopes, a common frame in which each is mounted on a substantially horizontal parallel axis, and means for mounting said frame for turning in azimuth.

29. In a gyro navigational apparatus, a pair of superimposed oppositely rotating, oppositely acting gyroscopes, a common frame in which each is mounted on a substantially horizontal parallel axis, and means for mounting said frame for turning in azimuth.

30. In gyroscopic navigational apparatus, the combination with a gimbal support, an outer follow-up frame journaled therein for turning about a vertical axis, a sensitive element within said frame including a main gyroscope, and an auxiliary gyroscope connected to said frame to stabilize said frame and gimbal support.

31. In gyroscopic navigational apparatus, the combination with a gimbal support, an outer follow-up frame journaled therein for turning about a vertical axis, a sensitive element within said frame including a main gyroscope and a vertical ring supporting the same on a substantially horizontal axis, and an auxiliary gyroscope connected to said frame to stabilize said frame and gimbal support.

32. In gyroscopic apparatus for ships, in combination, a frame mounted for oscillation about a horizontal axis, a gyroscope for stabilizing said frame about said axis, means revoluble about a vertical axis for supporting said gyroscope within said frame, and a second gyroscope for stabilizing said means and first gyroscope in azimuth.

33. In combination, a supporting frame mounted for oscillation about a horizontal axis and turning about a vertical axis, a stabilizing gyroscope for stabilizing said frame about said horizontal axis, means for mounting said gyroscope on said frame for freedom about a vertical axis and a second gyroscope mounted on said frame for preventing turning of the same about its vertical axis.

34. In combination, a supporting frame mounted for oscillation about a horizontal axis and turning about a vertical axis, a stabilizing gyroscope for stabilizing said frame about said horizontal axis, means for mounting said gyroscope on said frame for freedom about a vertical axis, a yielding means connecting said gyroscope and said frame about said vertical axis and a second gyroscope mounted on said frame for preventing turning of the same about its vertical axis.

In testimony whereof I have affixed my signature.

ELMER A. SPERRY.